(12) United States Patent
Dantinne et al.

(10) Patent No.: US 9,764,407 B2
(45) Date of Patent: Sep. 19, 2017

(54) PERSONALIZED INTERFACE FOR TORCH SYSTEM AND METHOD

(71) Applicant: ILLINOIS TOOL WORKS INC., Glenview, IL (US)

(72) Inventors: Markus Michael Dantinne, Combined Locks, WI (US); Edward Gerard Beistle, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/321,529

(22) Filed: Jul. 1, 2014

(65) Prior Publication Data

US 2014/0312022 A1    Oct. 23, 2014

Related U.S. Application Data

(62) Division of application No. 12/165,068, filed on Jun. 30, 2008.

(60) Provisional application No. 61/014,670, filed on Dec. 18, 2007.

(51) Int. Cl.
*B23K 9/10* (2006.01)
*B23K 9/095* (2006.01)

(52) U.S. Cl.
CPC .......... *B23K 9/0953* (2013.01); *B23K 9/1062* (2013.01)

(58) Field of Classification Search
CPC ............................. B23K 9/0953; B23K 9/1062
USPC ....... 219/108, 110, 125.1, 130.1, 130.5, 132, 219/136
See application file for complete search history.

(56) References Cited

U.S. PATENT DOCUMENTS 4,628,176 A * 12/1986 Kojima et al. ................ 219/110
4,717,805 A *  1/1988 Miyagawa .................... 219/108
4,973,814 A * 11/1990 Kojima et al. ................ 219/110
(Continued)

FOREIGN PATENT DOCUMENTS

CN      1841321       10/2006
EP      1702707 A1    9/2006
(Continued)

OTHER PUBLICATIONS

Application No. 2008801247358.8 filed Jul. 14, 2010—Chinese Office Action and Search Report dated Aug. 31, 2012.

*Primary Examiner* — Brian Jennison
(74) *Attorney, Agent, or Firm* — Fletcher Yoder P.C.

(57) ABSTRACT

There is provided a system and method for quick identification and selection of torch processes based on a profile scheme. In an illustrated embodiment, a profile selectable via a one-click process may define operational parameters for one or more torch processes. Multiple profiles may be identified by corresponding labels that are visible on the face of the system. Furthermore, in an illustrated embodiment, the profiles and associated torch processes may be automatically stored in the system upon user configuration of the operational parameters. For example, in one embodiment, the user may select a profile and configure a welding process. Upon changing an operational parameter, it may be automatically saved to the selected profile and process. Reselection of that profile may recall the last used process and its associated parameters. The operational parameters of other configured processes may then be retrieved by selecting the desired process within the selected profile.

20 Claims, 9 Drawing Sheets

(56) References Cited

U.S. PATENT DOCUMENTS

| | | | | |
|---|---|---|---|---|
| 5,278,390 | A | * | 1/1994 | Blankenship .............. 219/130.5 |
| 5,683,598 | A | * | 11/1997 | Moro ............................. 219/108 |
| 6,476,354 | B1 | * | 11/2002 | Jank et al. .............. 219/137 PS |
| 7,781,700 | B2 | * | 8/2010 | Harris ........................ 219/130.5 |
| 8,124,913 | B2 | * | 2/2012 | Artelsmair ............... 219/130.21 |
| 8,525,077 | B2 | * | 9/2013 | Peters et al. ............... 219/130.5 |
| 2003/0001896 | A1 | * | 1/2003 | Johnson .................. H04L 43/50 715/771 |
| 2003/0111451 | A1 | | 6/2003 | Blankenship |
| 2004/0122550 | A1 | * | 6/2004 | Klimko et al. ................ 700/212 |
| 2004/0232128 | A1 | * | 11/2004 | Niedereder et al. ....... 219/130.5 |
| 2006/0207980 | A1 | * | 9/2006 | Jacovetty et al. ......... 219/130.5 |
| 2007/0051711 | A1 | | 3/2007 | Kachline |
| 2007/0056942 | A1 | | 3/2007 | Daniel |

FOREIGN PATENT DOCUMENTS

| | | |
|---|---|---|
| EP | 1757397 A1 | 2/2007 |
| EP | 1775056 A1 | 4/2007 |
| WO | 03022503 A1 | 3/2003 |

* cited by examiner

PERSONALIZED INTERFACE FOR TORCH SYSTEM AND METHOD

CROSS REFERENCE TO RELATED APPLICATIONS

This is a Divisional Patent Application of U.S. Non-Provisional patent application Ser. No. 12/165,068, entitled "PERSONALIZED INTERFACE FOR TORCH SYSTEM AND METHOD", filed Jun. 30, 2008, which is a Non-Provisional Patent Application of U.S. Provisional Patent Application No. 61/014,670, entitled "PERSONALIZED INTERFACE FOR TORCH SYSTEM AND METHOD", filed Dec. 18, 2007, both of which are incorporated herein by reference in their entireties.

BACKGROUND

The invention relates generally to a torch system and control of various features according to user preferences.

Torch systems generally support different types of processes, including metal inert gas (MIG) welding, tungsten inert gas (TIG) welding, stick welding, air carbon arc cutting (CAC-A), plasma arc cutting, etc. Multi-process torch equipment may provide control for several processes in a single unit. A multi-process torch system may employ a relatively sophisticated user interface with controls, displays, etc. to setup and control the various processes for which it is designed. Depending on the specific application, an operator may be required to switch between welding and/or cutting processes on a regular basis to properly complete a job. Switching between processes may require the operator to select the new process to be used and to change the equipment settings to achieve optimal performance. This process is time consuming, impacts productivity, and requires the operator to remember the specific settings for each particular process. Furthermore, a single torch system is often used by multiple operators, and each operator may have personal preferences for a given type of process. Each operator may need to adjust the system before every use, which can become very time consuming.

BRIEF DESCRIPTION

A torch system, in one embodiment, may include a personalized interface having multiple selectors each corresponding to a configurable profile. Each selector may adjust operational parameters of the torch system upon selection. In another embodiment, a torch system may include a programmable controller having a personalized user interface. The personalized user interface may have at least one quick selector for recalling the operational parameters of a torch process. A torch system, in another embodiment, may include tangible, machine-readable media having code executable to save operational parameters for multiple profiles automatically upon user selection of the operational parameters for each profile and/or code executable to recall the operational parameters for each profile to configure the torch system based on a one-click user selection of each profile. In a further embodiment, a method includes automatically saving a user profile to a profile selector based on one or more selections of operational parameters of a torch system via controls separate from the profile selector. A further embodiment of a torch system may include a personalized interface having multiple customizable profiles, each having operational parameters for the torch system, wherein a desired customizable profile is selectable without scrolling through a list of the customizable profiles.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components. Finally, in the illustrated embodiments, features may be referred to as "selectors," "buttons," "switches," or "knobs," however these elements are not intended to be limited to the specific terminology used. That is, a "button" may include, for example, a push-button, a toggle switch, a knob, or any similar device. Likewise, a "switch" is not limited to a single type of switch, such as a toggle, but may include a push-button or a knob, among other devices. A "knob" may be, for example, a quadrature encoder, a dial, a rotary switch, or a similar device.

A "quick selector," as the term is used herein, may include any device that enables quick selection or deselection of an option. For example, a button may be considered a quick selector because an option may be selected or deselected merely by depression of the button. Likewise, a switch or a knob may be considered a quick selector. A scrolling device, on the other hand, would not be considered a quick selector as such a device requires scrolling through a list to select or deselect an option. Similarly, multi-step selection devices are not quick selectors.

Figure 1:
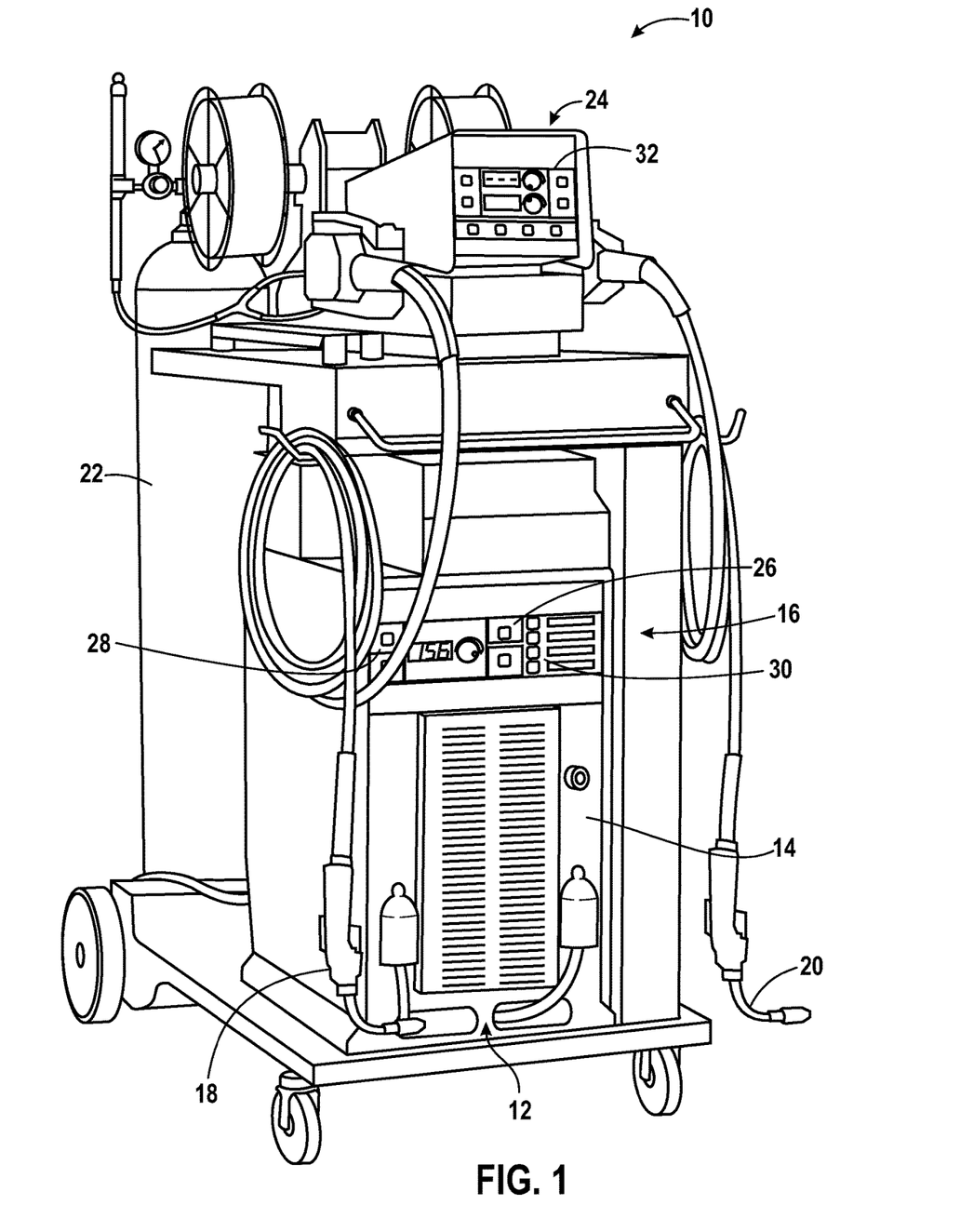
FIG. 1 is a perspective view of a torch system having a personalized interface in accordance with exemplary embodiments of the present invention.

FIG. 1 illustrates a multi-process torch system 10 in accordance with an embodiment of the present invention. The multi-process torch system 10 may be configured to perform multiple processes, such as, for example, stick welding, flux cored arc welding (FCAW), gas metal arc welding (GMAW), shielded metal arc welding (SMAW), gas tungsten arc welding (GTAW), metal inert gas (MIG) welding, pulsed MIG welding, tungsten inert gas (TIG) welding, pulsed TIG welding, spot welding, resistance spot welding (RSW), submerged arc welding (SAW), regulated metal deposition (RMD), air carbon arc cutting (CAC-A), plasma arc cutting, induction heating, power generation, wire feeding, or a combination thereof.

The system 10 generally includes a power/control unit 12 having a power source 14 and a controller 16; right and left torches or guns 18 and 20, respectively; and a shielding gas source 22. The power/control unit 12 may be coupled to a wire feeder 24 configured to control the wire supply to the first and second guns 18 and 20. The controller 16 may include a power source interface 26 and a process control board (not shown). The power source interface 26 includes a process interface 28 for inputting operational parameters to the process control board and a profile interface 30 for selecting a desired profile. The process control board includes hardware and circuitry for storing programs (e.g., code on memory) to operate the torch system 10. Furthermore, the wire feeder 24 may include a wire feeder interface 32 coupled to the controller 16 such that operational parameters may be input to the process control board via the wire feeder interface 32. The power source interface 26 and the wire feeder interface 32 may control the same or different configuration settings.

Figure 2:
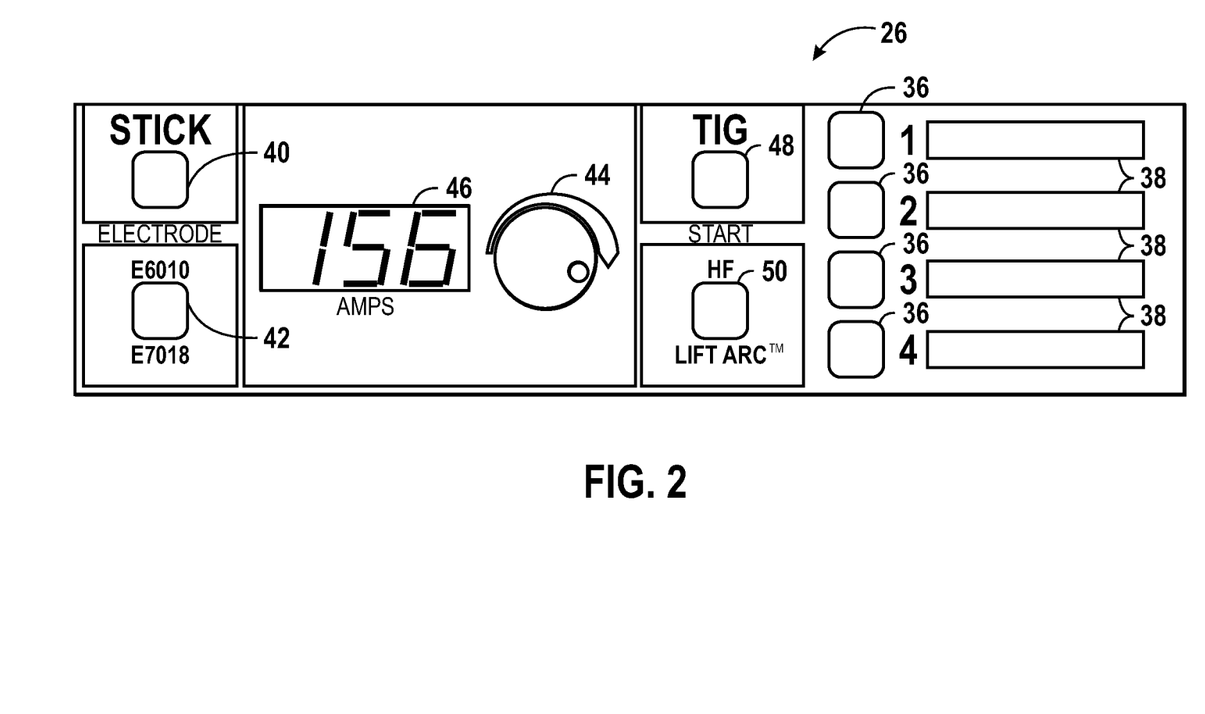
FIGS. 2-4 are front views of exemplary personalized interfaces for use with the torch system of FIG. 1 in accordance with embodiments of the present invention.

An exemplary embodiment of the power source interface 26 with unique personalization control features is illustrated in FIG. 2. The power source interface 26 may include controls for multiple welding, cutting, or heating processes. In the illustrated embodiment, the power source interface 26 includes a plurality of profiles which may be selected by choosing a profile selector 36. Each profile selector 36 has an adjacent display area 38 for labeling the profile. For example, each profile may be assigned to a different user, and the display areas 38 may list the users' names. In another example, each profile may be assigned to a torch process, and the display areas 38 may list the processes. The display areas 38 may include white boards or ceramic labels on which users may write with a pen, grease pencil, marker, etc. In another embodiment, the display areas 38 may enable application of stickers or magnets to the power source interface 26. In a further embodiment, the display areas 38 may include digital displays, such as an LCD or similar screen. In this embodiment, labels may be programmed into the power source interface 26 for display on the display areas 38. A light integral with or adjacent to each profile selector 36 may indicate which profile is selected. The light may be integral with the profile numbers such that the selected profile number lights up while the profile is selected. If the display area 38 is a display, the display may indicate which profile is selected by lighting up or alerting the user in another manner.

Each profile may correspond to one or more sets of operational parameters for the torch system 10 (FIG. 1). For example, each profile may correspond to a type of process, such as those described above. A user may utilize controls independent from the profile selectors 36, as described below, to set the operational parameters for each process and then simply choose one of the profile selectors 36 to recall the saved operational parameters for that profile. In another embodiment, each profile may be associated with a particular user, and the operational parameters for multiple processes may be designated within the user's profile. That is, operational parameters for multiple processes, such as those described above, may be saved to each profile. The desired user profile may be recalled by selecting one of the profile selectors 36. The desired process may then be selected, as described below, and the user's saved operational parameters for that process are recalled. In any embodiment, selection of the desired profile selector 36 automatically recalls operational parameters associated with the selected profile without the need to change other settings on the torch system 10. Additionally, the torch system 10 may be set to a default profile and process upon first use, and each profile may likewise have default settings which can be adjusted by the user, as described below.

The illustrated exemplary power source interface 26 includes control settings for stick and TIG welding processes. A stick button 40 may initiate the stick welding process. The power source interface 26 may include indicators to notify the user which settings are selected. For example, selection of the stick button 40 may light up the "STICK" label or the button 40. An electrode switch 42 allows the user to select between multiple possible electrodes to use in the stick welding process. For example, the user may select between an E6010 and an E7018 electrode, depending on the process parameters. Other electrode types may be offered as options in addition to, or instead of, the E6010 and E7018 electrodes. The electrode switch 42 may be a toggle switch, and the selected electrode may be the one toward which the toggle is biased. In another embodiment, the electrode switch 42 may be a push button, and the label for the selected electrode may light up to indicate the selection. Finally, an amperage knob 44 enables the user to adjust the amperage supplied to the torch (e.g., welding gun) in the stick welding process. The amperage may be displayed on a display 46, such as, for example, an LED or a seven-segment display. As described in more detail below, after the user selects one of the profile selectors 36 and adjusts the settings for the stick welding process, the selected settings may be automatically saved to the selected profile. That is, the user may return at a later time and select the previously-used profile to enable the configured settings. In another embodiment, the user may adjust the settings for the stick welding process then save the settings to a particular profile. For example, the profile selector 36 corresponding to the desired profile may be depressed and held for several seconds to save the settings to that profile.

In addition to the stick welding process, the exemplary power source interface 26 includes control settings for a TIG welding process. A single profile may store several processes, including both stick welding parameters and TIG welding parameters. Parameters for additional processes may be stored in each profile and accessed via additional buttons. For example, a TIG button 48 may initiate the TIG welding process. As described above, selection of the TIG button 48 may light up the "TIG" label or the button 48. Parameters for both stick welding and TIG welding may be stored in a given profile and recalled upon depression of the stick button 40 or the TIG button 48, depending on the desired process. A start switch 50 enables the user to select whether to use a high frequency start method or a lift arc start method. The chosen start method may be indicated by a toggle switch or a lit label. The amperage knob 44 may be utilized to adjust amperage for the TIG welding process in addition to the stick welding process. Adjusting the amperage knob 44 changes the amperage setting only for the selected process. That is, if the TIG button 48 is depressed, rotating the amperage knob 44 adjusts only the amperage setting for the TIG welding process; the amperage setting for the stick welding process is not affected.

Figure 3:
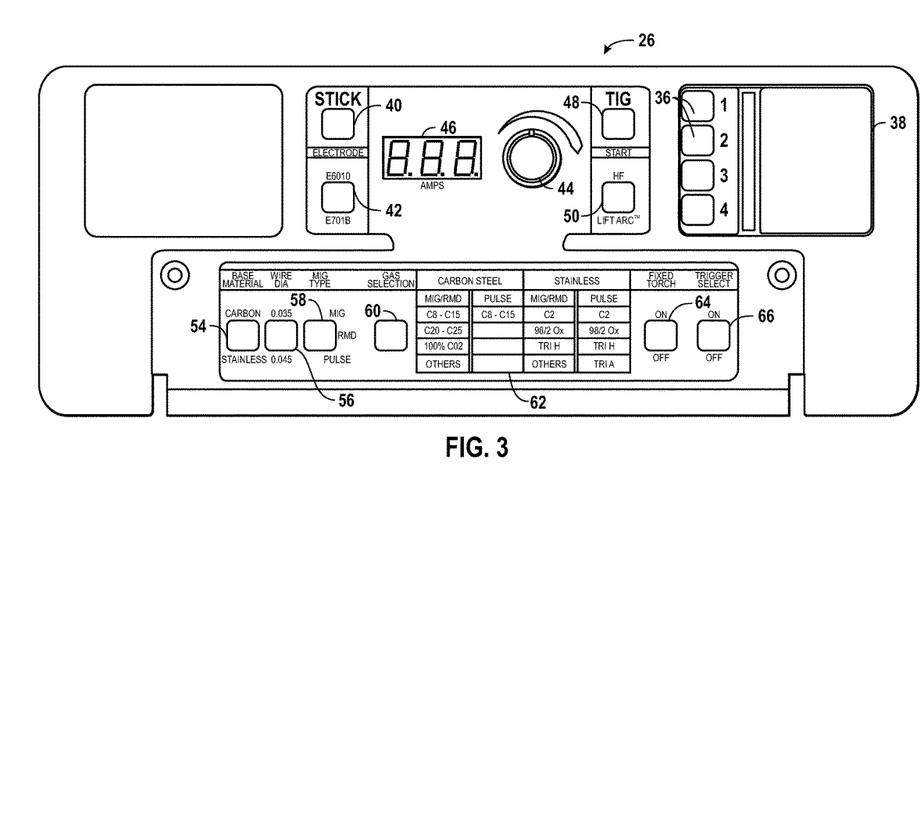

FIG. 3 illustrates another embodiment of the power source interface 26 with unique personalization control features. In the illustrated embodiment, additional controls are provided to enable programming of additional welding process parameters for each profile. Specifically, the illustrated interface 26 includes all features of the interface 26 (FIG. 2) along with many more user selections related to material, wire size, gas, and so forth. As with the buttons described above, selection of the operating parameters may be indicated by the position of a toggle or knob, or by the chosen option lighting up.

For each welding process, a base material for creating a weld, such as carbon steel or stainless steel in the illustrated embodiment, may be designated using a base material switch 54. A wire size switch 56 enables the user to specify the diameter (e.g., 0.035 or 0.045 inches) of the wire used in the welding process. For a MIG welding process, a MIG type switch 58 may be utilized to select the desired MIG welding process. For example, the user may designate a standard MIG process, a regulated metal deposition (RMD) process, or a pulsed MIG process via the switch 58.

In addition, a gas selection button 60 may enable the user to select a shielding gas for the MIG welding process. The gas selection button 60 may, for example, be pressed until the desired gas is illuminated on an adjacent display chart 62. The gas selection may be limited by the base material and MIG type selections, as indicated in the illustrated embodiment. For example, if the user has chosen carbon as the base material (switch 54) and pulse as the MIG type (switch 58), the gas selection may be limited to C8-C15 (i.e., a mixture of argon and carbon dioxide containing approximately 8-15% $CO_2$) as this is the only option available in the Carbon Steel—Pulse column in display chart 62. On the other hand, if the user has chosen stainless steel as the base material (switch 54) and RMD as the MIG type (switch 58), the gas selection may include C2 (i.e., a mixture of argon and carbon dioxide containing approximately 2% $CO_2$), 98/2 Ox (i.e., a mixture containing approximately 98% argon and 2% oxygen), TriH (i.e., a mixture containing approximately 90% helium, 7.5% argon, and 2.5% carbon dioxide), or others as indicated in the Stainless—MIG/RMD column. Selection of "others" may change the displayed options if more options are available than fit on the display 62. It should be understood that any appropriate gases may be utilized in the present system, and the display chart 62 may be updated accordingly.

Additionally, if a fixed torch is utilized in the designated welding process, the user may indicate this by depressing a fixed torch button 64. Finally, a trigger select button 66 may enable or disable the ability of the user to change profiles by clicking a trigger on the torch or gun.

Figure 4:
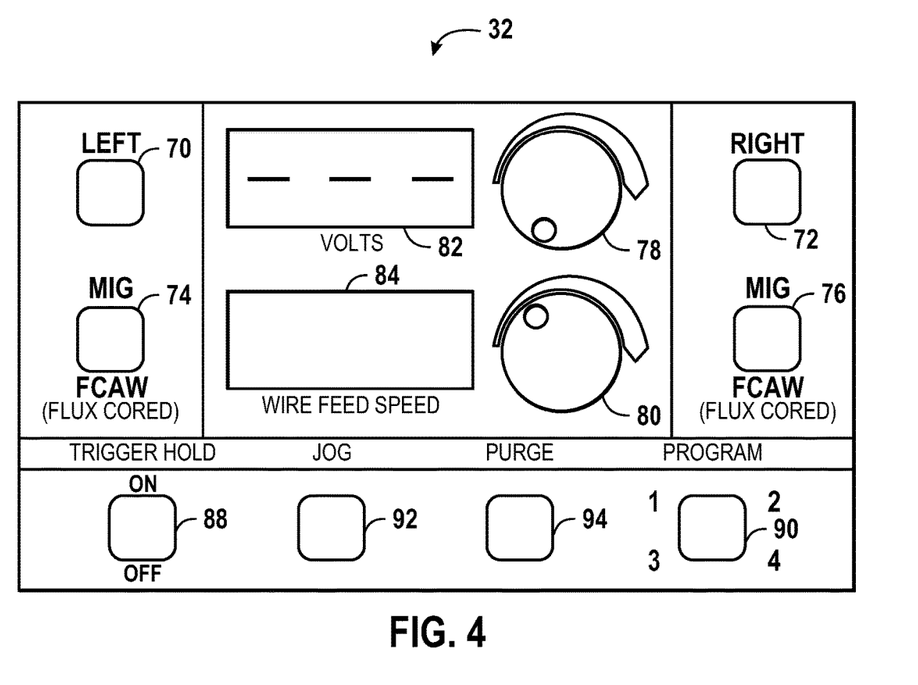

Turning to FIG. 4, an exemplary embodiment of the wire feeder interface 32 with unique personalization control features is illustrated. The wire feeder interface 32, like the power source interface 26, may include control settings for various processes (e.g., welding) using a wire. In the illustrated embodiment, a left gun button 70 and a right gun button 72 may be utilized to select the desired gun 18 or 20, respectively. As described above, the user may determine whether buttons on the wire feeder interface 32 are selected based on the position of a toggle switch, a lit label, or a similar indicator. For example, where a button has only one selection, as with the left and right gun buttons 70 and 72, the buttons 70 and 72 may light up upon selection. For each gun, a welding process may be selected using process selection buttons 74 and 76. For example, the process selection button 74 may be depressed or toggled to select between a MIG welding process and a flux cored arc welding (FCAW) process using the left gun 18. Similarly, the process selection button 76 may enable selection of a MIG welding process or a FCAW process using the right gun 20. Within each welding process, parameters may be set utilizing a voltage knob 78 and a wire feed speed knob 80. The selected voltage and wire feed speed are displayed on displays 82 and 84 adjacent to the knobs 78 and 80, respectively. The displays 82 and 84 may be, for example, LCDs or seven-segment displays. A trigger hold button 88 may enable the user to weld for an extended period of time without holding down the welding gun trigger.

In addition, a profile selection button 90 may be disposed on the wire feeder interface 32 to enable the user to easily switch between profiles without returning to the power/control unit 12 (FIG. 1). This feature is useful when the power source 14 is located remotely from the wire feeder 24. In one embodiment, the label for the chosen profile may be lit to indicate which profile is selected. In another embodiment, the profile selection button 90 may be a knob with an indicator pointing at the selected profile. Other indicators of profile selection may be used as well. Additionally, a jog button 92 may be depressed to thread wire through the welding gun 18 or 20 without activating the weld process. Similarly, a purge button 94 may be depressed to purge shielding gas from the gun 18 or 20 without activating the welding process.

Figure 5:
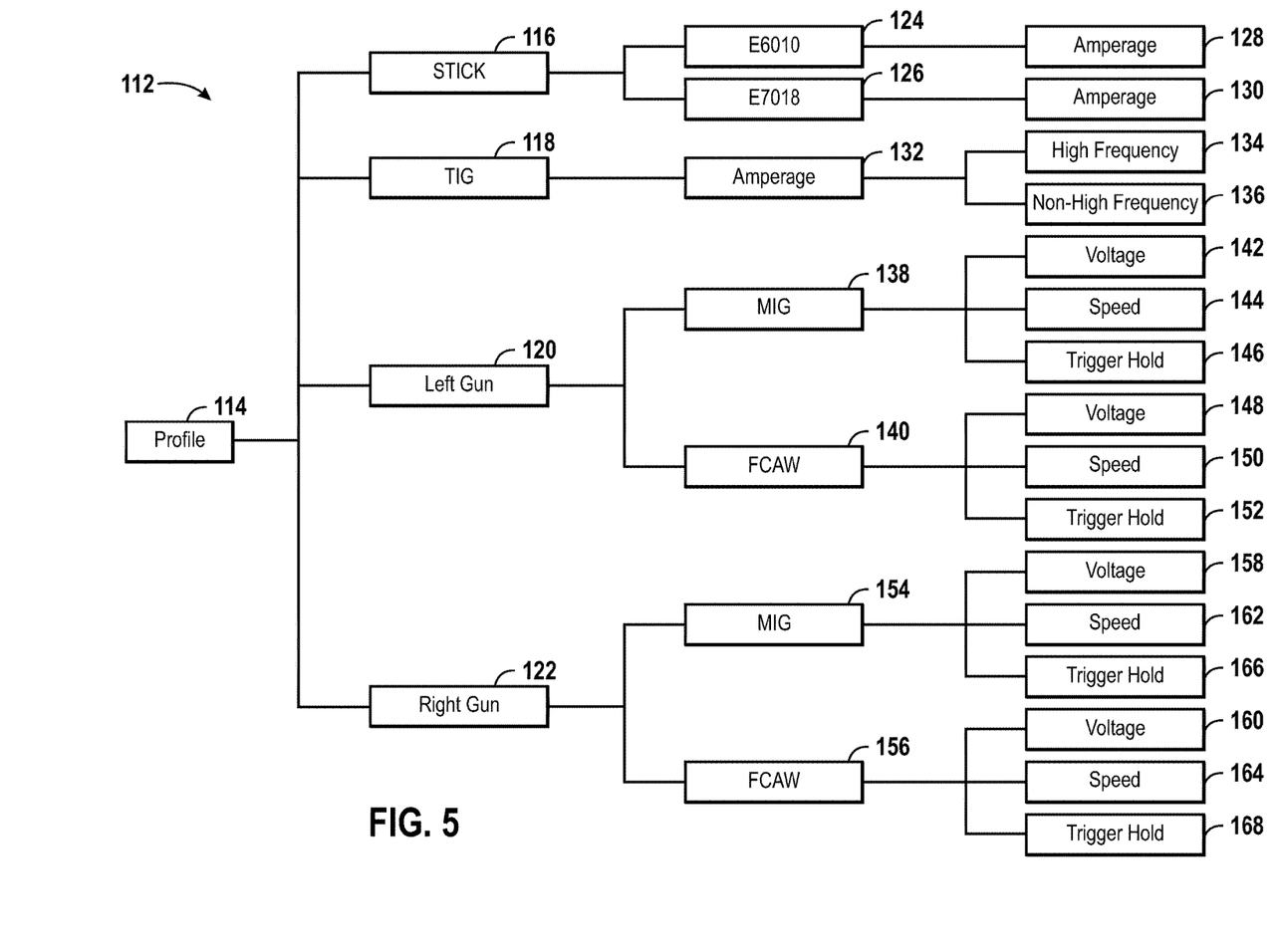
FIG. 5 is an organizational chart for a plurality of profiles and processes in accordance with the exemplary embodiments illustrated in FIGS. 2-4.

FIG. 5 is a flow chart illustrating an exemplary profile hierarchy 112 that may be associated with the profile selectors 36 and 90 of the exemplary interfaces 26 and 32 illustrated in FIGS. 2-4. The illustrated embodiments include only four profiles, although an unlimited number of profiles may be utilized. In the illustrated embodiments, a user may select a user/process profile 114 by selecting one of the profile selectors 36 (FIG. 2 or 3) or depressing the profile selection button 90 (FIG. 4) until the desired profile number is selected. The first time the profile 114 is selected, default welding parameters are automatically recalled. For example, the default settings for profile one may be a stick welding process utilizing an E6010 electrode at 85 amps. The user may change the settings for the stick welding process or select a different process. In this example, any changes made while profile one is selected are saved such that they may be recalled at a later time. A different user/process profile 114 may be selected, and upon returning to profile one the last utilized process and settings will automatically be recalled. In addition, changes to any other processes within profile one may be recalled by selecting the desired process.

The user may select the desired profile 114 via the profile selectors 36 and 90. By programming operational parameters into the profiles 114, the desired parameters associated with each profile 114 may be recalled with a single push of a button (e.g., the profile selectors 36 and 90) without the trouble of manually adjusting each and every control on the system 10. For example, the profile 114 may correspond to a specific user and/or to a specific process. Within the profile 114, the user may select between a stick process 116, a TIG process 118, a left gun process 120, or a right gun process 122. The stick process 116 may include selection of either an E6010 electrode 124 or an E7018 electrode 126. For each electrode 124 and 126, amperage 128 and 130 may be set, respectively. Likewise, in the TIG process, an amperage 132 may be input, and a high frequency start 134 or a lift-arc start 136 may be selected. For the left gun 120, a MIG process 138 or a FCAW process 140 may be selected. A voltage 142 and a wire feed speed 144 may be adjusted for the MIG process 138, and a trigger hold option 146 may be selected. Likewise, for the FCAW process 140, a voltage 148 and a wire feed speed 150 may be input, and a trigger hold option 152 may be selected. As with the left gun process 120, the right gun process 122 may be a MIG process 154 or a FCAW process 156. For each of the MIG process 154 and the FCAW process 156, the user may select a voltage 158 and 160, a wire speed feed 162 and 164, and a trigger hold option 166 and 168, respectively. Other settings and processes may be specified based on the processes available on the given welding system 10. If multiple processes are defined in the desired profile 114, the user may also press a button (e.g., stick button 40, TIG button 48, left gun button 70, right gun button 72, etc.) to recall the operational parameters associated with the desired process 116, 118, 130, or 122 in the desired profile 114.

Furthermore, it may be desirable to set each profile 114 to a specific process having user-independent settings. For example, profile one may be set to automatically recall settings for the stick welding process 116, while profile two may automatically initialize the TIG welding process 118. Every user of the welding system 10 may then utilize the same process settings. This feature enables one-touch switching between processes by assigning a different process or different settings to each profile 114. One-touch recall of different process settings may be especially useful where certain welding processes are commonly used on the welding system 10 and the settings for each process do not change from user to user. The process specified for each profile 114 may be labeled on the display area 38 (FIGS. 2-3) so that the user can easily identify which profile selector 36 corresponds to which profile 114.

In addition, if the welding system 10 is used by different welders who have preferred settings for each welding process, each profile 114 may be assigned to a different user. The users' names may be displayed on the display areas 38 (FIGS. 2-3) adjacent to the profile selectors 36. The user may then select his or her name and adjust the available welding process to preference. In this scenario, the user may press the desired profile selector 36 to return to the last welding process utilized by that user. If desired, a different process may then be selected within that user's profile 114. In another embodiment, the profile selectors 36 may be pressed multiple times to step through the processes associated with the user. That is, the user may press the profile selector 36 next to his name once to recall his profile 114 and his first designated process (or last used process). Pressing the same profile selector 36 again may switch the system 10 to the next process associated with the profile 114. In this manner, the user may select his profile selector 36 until the desired process is activated, as indicated by the same indicators described above which would otherwise indicate selection of a given process.

Figure 6:
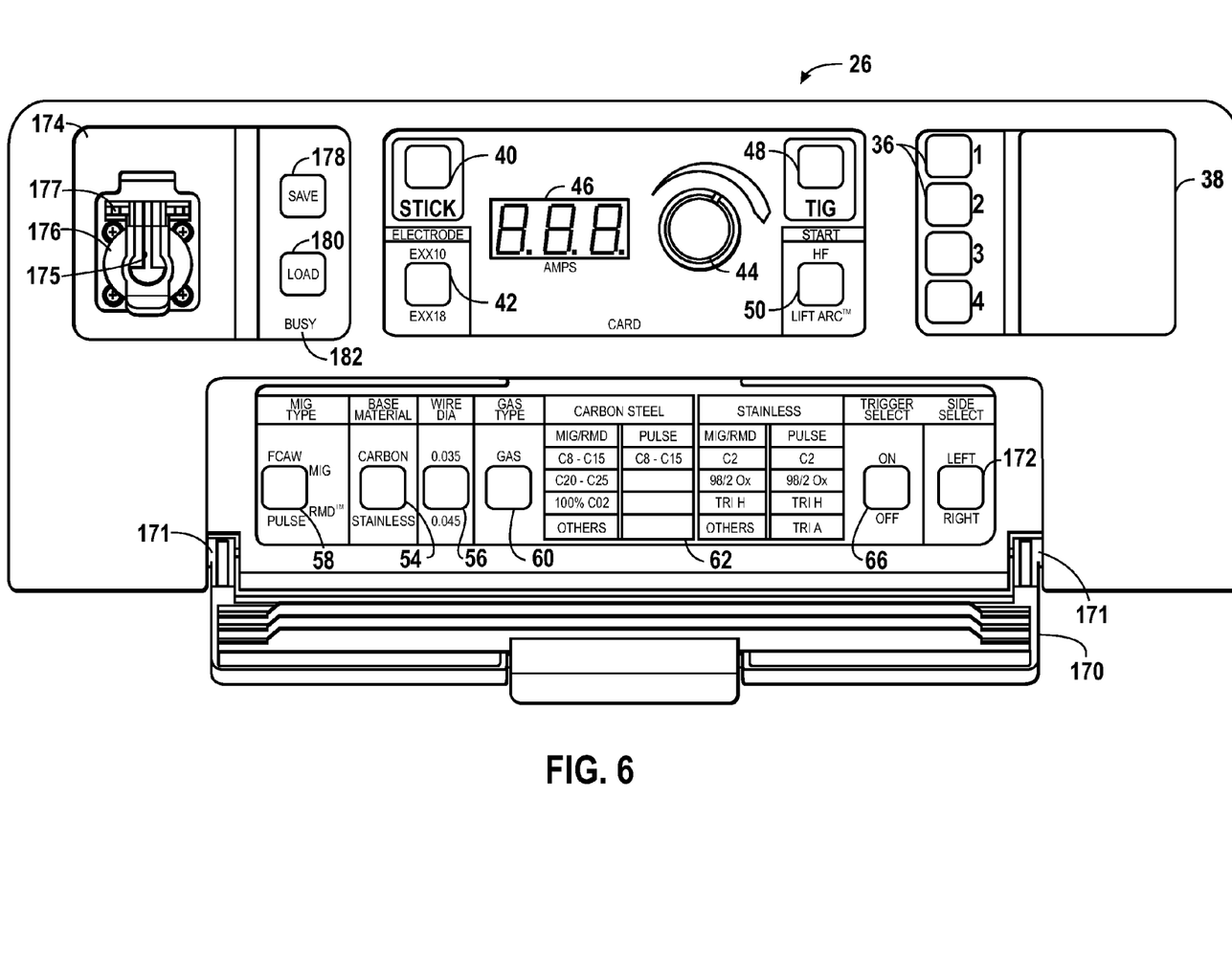
FIGS. 6-7 are front views of exemplary personalized interfaces for use with the torch system of FIG. 1 in accordance with further embodiments of the present invention.

Another exemplary embodiment of the power source interface 26 with unique personalization control features is illustrated in FIG. 6. Many of the controls described in FIG. 3 are also included in the present embodiment, wherein like element numbers indicate like features. For example, to enable programming of welding process parameters for each profile, the illustrated interface 26 includes user selections related to continuous wire process type, material, wire, gas, and so forth. A cover 170 may be attached to the power source interface 26 to protect and/or hide some or all of the selection buttons when closed. In the illustrated embodiment, the cover 170 is rotatably coupled to the interface 26, e.g., via a hinge or pivot joints 171. As with the buttons described above, selection of the operating parameters may be indicated by the position of a toggle or knob, or by the chosen option lighting up. As described above, the buttons, selectors, knobs, and so forth described herein may be push-buttons, toggles, knobs, quadrature encoders, dials, rotary switches, or any similar device. In addition, the profile selector 36 operates as described above.

The power source interface 26 illustrated in FIG. 6 may enable selection of operating parameters for stick, TIG, and MIG welding processes. For example, the stick button 40 initiates programming of a stick welding process, and the electrode switch 42 allows the user to select the electrode type. In the illustrated embodiment, the electrode types may be denoted as EXX10 and EXX18 to indicate that electrodes of varying tensile strengths may be interchanged in the system. Similarly, the TIG button 48 initiates programming of a TIG welding process. The user may select a high frequency start method or a lift-arc start method using the start switch 50. In addition, the amperage supplied to the torch (e.g., welding gun) may be altered by rotating the amperage knob 44, and the output amperage may be displayed on the display 46.

When a continuous wire process is selected, the MIG type switch 58 enables the user to select a continuous wire welding process type, such as, for example, a flux-cored arc welding (FCAW) process, a standard MIG welding process, a regulated metal deposition (RMD) process, or a pulsed MIG welding process. For the selected process, the base material may be selected or input via the base material switch 54, and the wire diameter may be selected or input via the wire size switch 56. In addition, the gas selection button 60 may enable the user to select a shielding gas for MIG welding processes, as described above. The selected gas may be displayed on the adjacent display chart 62. The trigger select button 66 may enable or disable the ability of the user to change profiles by clicking the trigger on the torch or gun (e.g., the right and left welding guns 18 and 20).

In addition to the process settings configurable at the power source interface 26, the left or right gun 18 or 20 (FIG. 1) may be selected via a side select button 172. By enabling the user to select the gun at the power source, the user may not be required to walk back and forth between the power source and the wire feeder. This feature may be especially useful where the power source is located at a considerable distance from the wire feeder.

The illustrated embodiment of the power source interface 26 may also include a memory interface 174. The memory interface 174 may enable communication with a portable memory unit, such as a flash memory card, a pen drive, or an external hard drive, on which profile information may be stored. In an exemplary embodiment, the memory interface 174 may have one or more memory card slots 175 to receive portable memory cards (e.g., Secure Digital, CompactFlash, Memory Stick, xD, PCMCIA, SmartMedia, etc.). In another embodiment, the memory interface 174 may include a port to which an external memory device may be coupled (e.g., USB or mini-USB device, external hard drive, FireWire device, eSATA drive, i.Link device, parallel SCSI device, etc.). A cover 176 may protect the memory interface 174 when not in use or when a memory card is inserted in the card slot 175. The cover may be rotatably coupled to the interface 26, e.g., via a hinge or pivot joints 177.

While the portable memory unit is coupled to the memory interface 174, information may be copied to and/or from the process control board (not shown). For example, by pressing a save button 178, the user may copy the settings from the power source interface 26 to the portable memory device. Similarly, the user may press a load button 180 to automatically implement settings stored on the portable memory device. In another embodiment, the memory interface 174 may automatically load information from the portable memory device upon coupling the memory device to the interface 26 (e.g., plug-and-play). To indicate that the portable memory device is being accessed, a busy indicator 182 may be illuminated and/or may flash on and off.

As described above, changes input to the torch system 10 (FIG. 1) via the exemplary power source interface 26 may be automatically saved to the profile which is selected at the time, or the changes may be saved manually to the desired profile. The selected profile may be indicated by the profile selectors 36 (e.g., via an integral or adjacent light). Profiles may be saved to the internal process control board and/or to the portable memory unit. Each profile may correspond to one or more sets of operational parameters for the torch system 10, and the operational parameters may be recalled at a later time upon reselection of a given profile.

Figure 7:
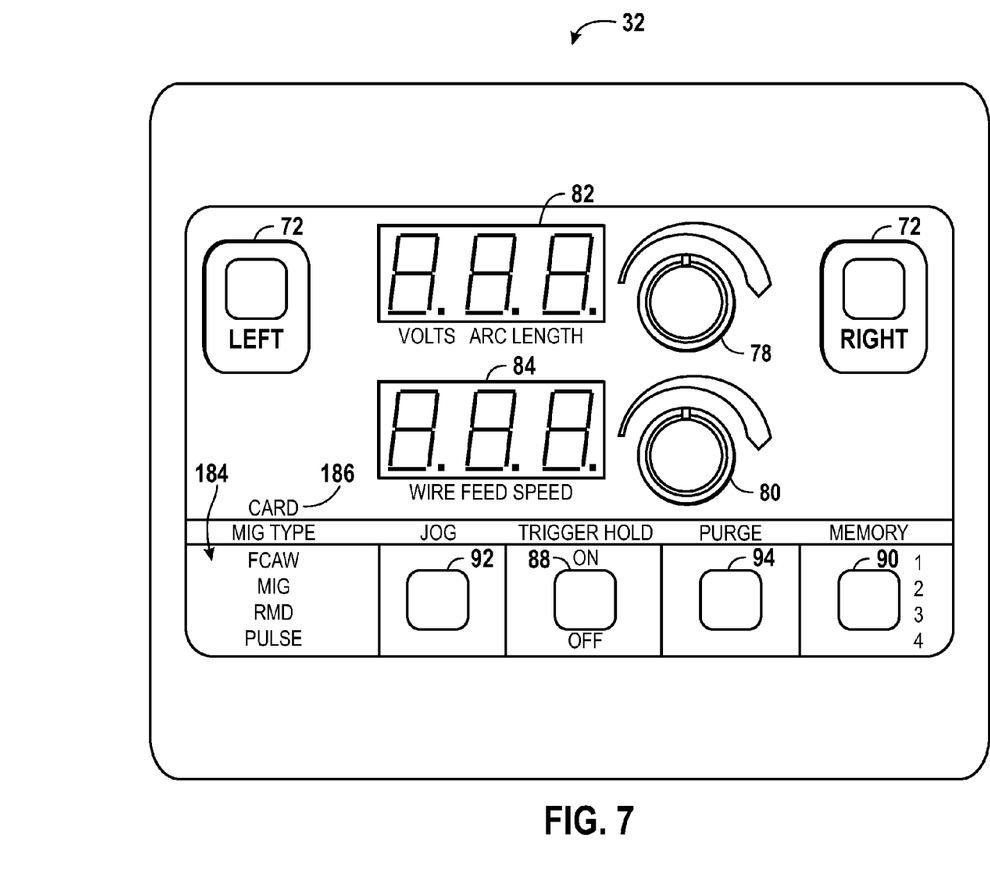

FIG. 7 illustrates another embodiment of the wire feeder interface 32 for use with the exemplary power source interface 26 illustrated in FIG. 6. The wire feeder interface 32 includes the left gun button 70 and the right gun button 72 to enable selection of the desired gun 18 or 20, respectively. As described above, the user may determine whether buttons on the wire feeder interface 32 are selected based on the position of a toggle switch, a lit label, or a similar indicator. The MIG process type (e.g., FCAW, standard, RMD, or pulse) selected at the power source indicator 26 (FIG. 6) may be indicated on the wire feeder interface 32 by a continuous wire process indicator 184. For example, the selected process type may be illuminated and/or may flash on and off to indicate its selection.

Within each MIG welding process, the voltage parameters and/or arc length may be set using the voltage knob 78, and the wire speed may be set using the wire feed speed knob 80. The selected voltage and wire feed speed are displayed on the displays 82 and 84 adjacent the knobs 78 and 80, respectively. As described above, the jog button 92 may be depressed to thread wire through the welding gun 18 or 20 without activating the weld process. The trigger hold button 88 may enable the user to weld for an extended period of time without holding down the welding gun trigger. The purge button 94 may be depressed to purge shielding gas from the gun 18 or 20 without activating the welding process.

In addition, the profile selection button 90 may enable the user to easily switch between profiles without returning to the power/control unit 12 (FIG. 1). Again, changes input via the exemplary wire feeder interface 32 may be stored to the selected profile for later recall. Any changes made while a particular profile is selected may be automatically saved to that profile such that reselection of the profile returns the settings to the last used settings for that profile. In another embodiment, changes may be manually saved to a desired profile after the settings have been adjusted. For example, a save button (not shown) may be activated, and the desired profile may be selected by depressing the profile selection button 90. Selection of the save button again may then save the settings to the selected profile. Furthermore, an indicator 186 may signal to the operator that the portable memory unit is being accessed, similar to the busy indicator 182 (FIG. 6). The indicator 186 may be illuminated when data is being transferred via the memory interface 174.

Figure 8:
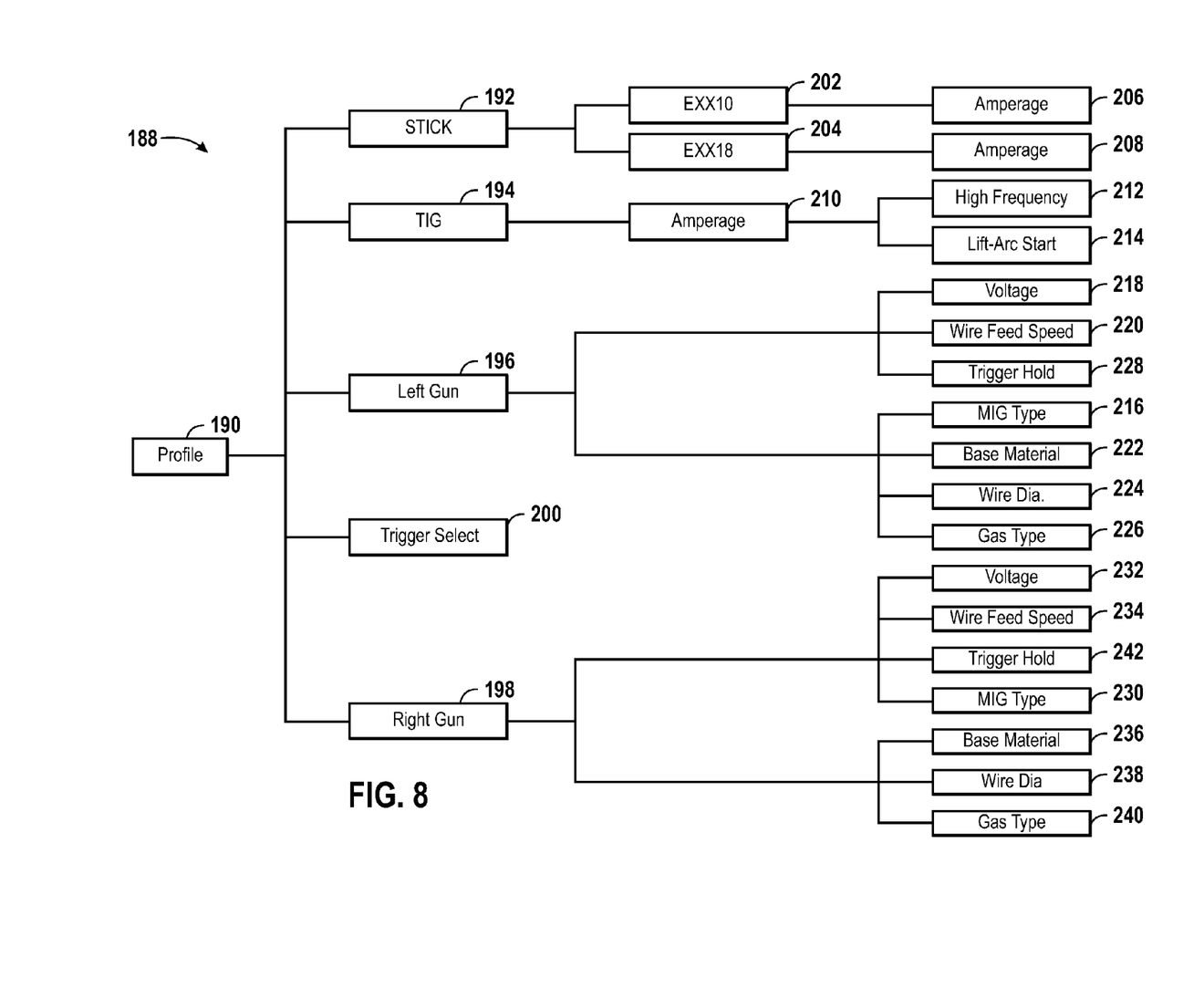
FIG. 8 is an organizational chart for a plurality of profiles and processes in accordance with the exemplary embodiments illustrated in FIGS. 7-8.

FIG. 8 is a flow chart illustrating an exemplary profile hierarchy 188 that may be associated with the profile selectors 36 and 90 of the exemplary interfaces 26 and 32 illustrated in FIGS. 6-7. In the illustrated embodiments, the user may select a user/process profile 190 by selecting one of the profile selectors 36 (FIG. 6) or depressing the profile selection button 90 (FIG. 7) until the desired profile number is selected. As described above with respect to FIG. 5, default welding parameters are automatically recalled the first time the profile 190 is selected. Any changes made while a given profile 190 is selected may be automatically or manually saved such that they may be recalled at a later time by simply selecting that profile 190 again.

Within the profile 190, the user may select between a stick welding process 192, a TIG welding process 194, a left gun process 196, or a right gun process 198. Additionally, a trigger select option 200 may enable the profile 190 to be selected via the trigger on the torch or gun (e.g., the right and left welding guns 18 and 20). The stick welding process 192 may include selection of either an EXX10 electrode 202 or an EXX18 electrode 204. For each electrode 202 and 204, amperage 206 and 208 may be set, respectively. Likewise, in the TIG welding process, an amperage 210 may be input, and a high frequency start 212 or lift-arc start 214 may be selected.

If the left gun process 196 is selected, a MIG process type 216 may be chosen. In addition, a voltage 218, a wire feed speed 220, a base material 222, a wire diameter 224, and a gas type 226 may be selected. A trigger hold option 228, which allows the user to weld for an extended period of time without holding down the welding gun trigger, may also be enabled or disabled. Similarly, if the right gun process 198 is selected, a MIG process type 230 may be chosen. A voltage 232, a wire feed speed 234, a base material 236, a wire diameter 238, and a gas type 240 may also be selected. In addition, a trigger hold option 242 may be enabled or disabled.

Furthermore, the profile 190 may be enabled to permit automatic profile selection through actuation of the left or right gun trigger. Enabling the trigger select option 200 on two or more profiles allows the user to easily switch between the profiles in which trigger select is activated. For example, if profiles 1 and 3 have trigger select enabled, the weld operator may select between the two profiles by rapidly actuating the active gun trigger. Subsequent actuation of the active gun trigger will switch between profiles 1 and 3. If trigger select is enabled on more than two profiles, trigger actuation will sequentially toggle through the profiles.

Other settings and processes may be specified based on the processes available on the given welding system 10. If multiple processes are defined in the desired profile 190, the user may also press a button (e.g., the stick button 40, the TIG button 48, the side select button 172, the left gun button 70, the right gun button 72, etc.) to recall the operational parameters associated with the desired process 192, 194, 196, or 198 in the desired profile 190. Selection of various processes based on the process and/or the user may be programmed, as described above.

Figure 9:
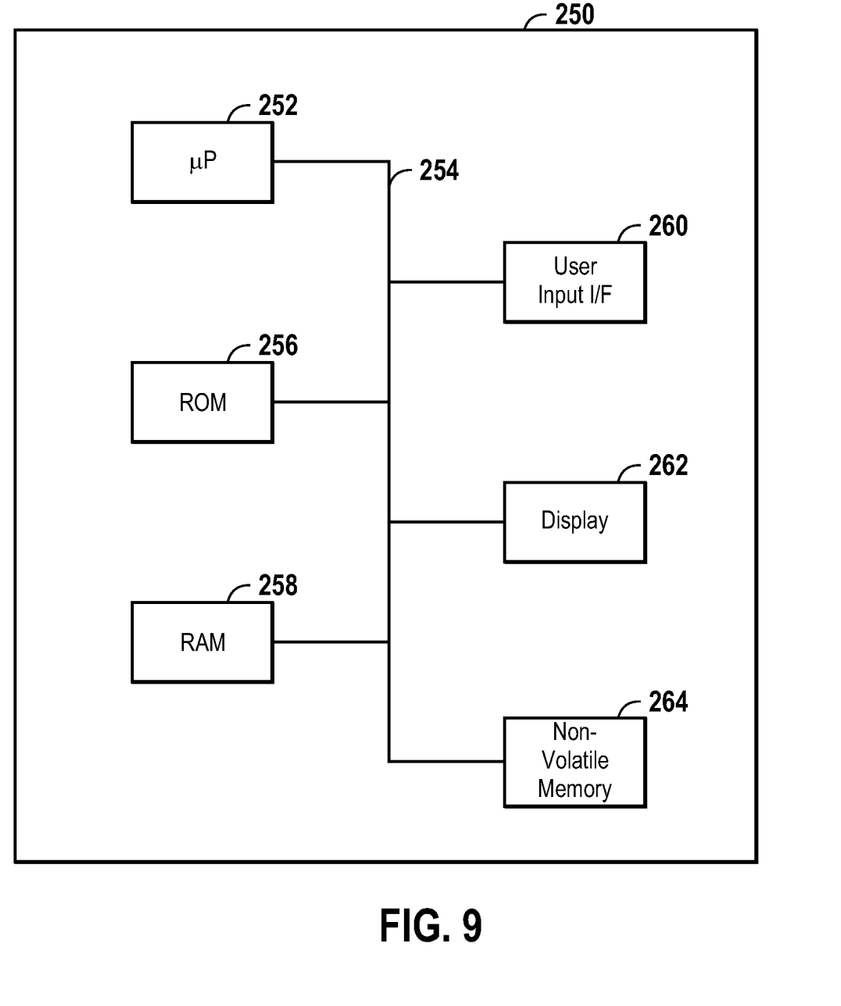
FIG. 9 is a block diagram of a process control board for use in the torch system of FIG. 1 in accordance with embodiments of the present invention.

FIG. 9 illustrates an exemplary process control model 250 in accordance with an embodiment of the present technique. Specifically, certain components of the power/control unit 12 (FIG. 1) are illustrated. The process control model 250 may include, for example, a microprocessor 252 connected to a bus 254. Also connected to the bus 254 are a read-only memory (ROM) 256, a random access memory (RAM) 258, user input interfaces 260, and a display 262. The ROM 256 and the RAM 258 may be utilized to store programming information, such as, for example, programs to properly translate user input to desired output from the system 10. The microprocessor 252 may utilize the user input and stored programs to command the power/control unit 12 to operate according to the profiles. The user input interfaces 260 may include, for example, the interfaces 26 and 32 having profile selectors 36 and 90 and various operational control buttons, knobs, and switches described in FIGS. 2-4 and 6-7. The display 262 may include the amperage display 46, the voltage display 82, the wire feed speed display 84, the profile display 38, the chart 62, etc.

Furthermore, the process control model 250 may include a non-volatile memory 264. The non-volatile memory 264 may include, for example, a hard drive, a flash memory drive, a tape drive, ROM, PROM, EPROM, EEPROM, etc. The non-volatile memory 264 may be integral with or separate from the ROM 256. User/process profiles may be stored on the non-volatile memory 264, for example, in a look-up table, and recalled upon selection of the profile selectors 36 and 90. Default process settings may be initially stored on the non-volatile memory 264. In one embodiment, the user/process profiles may be updated automatically upon entering settings via the user input interface(s) 260. That is, as soon as a user changes a setting, such as adjusting the amperage knob 44 or pressing the left gun button 70, the active user/process profile may be updated to reflect the change. In another embodiment, the user/process profiles may be updated manually upon specific user input via the user input interface(s) 260. For example, after a user changes a setting, the user may select to save the settings to a specific user/process profile. If a different user/process profile is selected, the previous settings for that profile are recalled automatically from the non-volatile memory 264 and displayed on the display(s) 262.

In some embodiments, the non-volatile memory 264 may be portable and easily transferable to another system 10. For example, user/process profiles may be copied from a first system 10 to a flash memory drive and transported to another system 10, where the user/process profiles are loaded for use. The process control model 250 may contain both portable and fixed non-volatile memory 264, and transferring the user/process profiles may consist of copying the profiles between the portable and the fixed non-volatile memory 264. For example, user depression of the save button 178 (FIG. 6) may initiate copying of the displayed user/process profile from the fixed non-volatile memory 264 to the portable non-volatile memory 264. Similarly, depression of the load button 180 (FIG. 6) may initiate copying of the displayed user/process profile from the portable non-volatile memory 264 to the fixed non-volatile memory 264.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A torch system comprising:
a personalized interface, comprising:
a plurality of user profile selectors corresponding to a plurality of user profiles, wherein each of the plurality of user profiles corresponds to a user; and
a plurality of operational parameter controls separate from the plurality of user profile selectors and corresponding to a plurality of operational parameters of the torch system; and
one or more tangible, machine-readable media comprising code executable to:
automatically adjust operational parameters of the torch system when one or more selections are adjusted via the plurality of operational parameter controls;
automatically save the operational parameters to a user profile corresponding to a currently selected user profile selector in response to the adjustment of the one or more selections via the plurality of operational parameter controls after the user profile is selected via a user profile selector of the plurality of user profile selectors; and
automatically adjust the operational parameters of the torch system consistent with a user profile upon selection of a respective user profile selector;
wherein the each of the plurality of user profiles comprises the operational parameters of the torch system associated with one or more processes of the torch system.

2. The torch system of claim 1, wherein selection of a user profile selector enables recall and automatic adjustment of operational parameters of the torch system to the last used operational parameters for the user profile corresponding to the currently selected user profile selector.

3. The torch system of claim 1, wherein each user profile selector enables recall and automatic adjustment of operational parameters of the torch system without adjustment of the operational parameter controls.

4. The torch system of claim 1, wherein each user profile of the plurality of user profiles is selectable without scrolling through a list of the plurality of user profiles.

5. The torch system of claim 1, wherein the code is executable to save and recall the operational parameters for a plurality of different torch processes for each user profile.

6. The torch system of claim 1, wherein the plurality of user profile selectors comprise a plurality of buttons, each button corresponding to a single user profile.

7. The torch system of claim 1, wherein each user profile selector is disposed adjacent to a label area comprising one or more reusable labeling surfaces.

8. The torch system of claim 1, wherein each user profile selector is disposed adjacent to a label area comprising one or more displays.

9. The torch system of claim 1, comprising a flash memory reader/writer configured to copy the operational parameters for the plurality of user profiles to/from a portable flash memory device.

10. The torch system of claim 1, wherein the operational parameters correspond to a stick welding process, a flux cored arc welding process, a gas metal arc welding process, a shielded metal arc welding process, a gas tungsten arc welding process, a metal inert gas welding process, a pulsed metal inert gas welding process, a tungsten inert gas welding process, a pulsed tungsten inert gas welding process, a spot welding process, a resistance spot welding process, a submerged arc welding process, a regulated metal deposition process, an air carbon arc cutting process, a plasma arc cutting process, or a combination thereof.

11. The torch system of claim 1, wherein the operational parameters comprise amperage, voltage, wire feed speed, electrode type, start method, base material, wire diameter, metal inert gas weld type, shielding gas, fixed torch, trigger hold, trigger select, or a combination thereof.

12. A torch system, comprising:
one or more tangible, machine-readable media comprising:
code executable to save operational parameters to a selected profile of a plurality of profiles automatically in response to adjustment of the operational parameters for the selected profile via operational parameter controls separate from a plurality of profile selectors corresponding to the plurality of profiles, wherein each of the plurality of profiles corresponds to a user and comprises the operational parameters of the torch system associated with one or more processes of the torch system;
code executable to recall the operational parameters for each profile to configure the torch system based on a one-click user selection of each profile via the profile selectors;
code executable to automatically adjust operational parameters of the torch system consistent with a selected profile; and
code executable to enable or disable selection of a profile via the plurality of profile selectors based on activation of a trigger select button disposed on a torch of the torch system.

13. The torch system of claim 12, comprising code executable to save and recall the operational parameters for a plurality of different torch processes for each profile.

14. The torch system of claim 12, comprising a non-volatile memory configured to store the operational parameters associated with the profiles.

15. The torch system of claim 12, wherein a programmable controller comprises the one or more tangible, machine-readable media and is configured to receive the operational parameters via at least one user interface.

16. A method, comprising:
automatically saving operational parameters for a user profile of a plurality of user profiles to a profile selector when one or more selections of the operational parameters of a torch system are adjusted via controls separate from the profile selector, wherein each of the plurality of user profiles corresponds to a user and comprises the operational parameters of the torch system associated with one or more processes of the torch system, wherein the user profile is automatically saved in response to the adjustment of the one or more selections of the operational parameters via the controls;
automatically adjusting operational parameters of the torch system consistent with the user profile; and
copying the operational parameters for the user profile to or from a portable flash memory device.

17. The method of claim 16, comprising recalling the operational parameters upon selection of the user profile via the profile selector.

18. The method of claim 16, wherein each user profile stores operational parameters for a plurality of different torch processes.

19. The torch system of claim 1, wherein the code is executable to enable or disable selection of a user profile via the plurality of user profile selectors based on activation of a trigger select button disposed on a torch of the torch system.

20. The method of claim 16, comprising enabling or disabling selection of a profile via the profile selector based on activation of a trigger select button disposed on a torch of the torch system.

* * * * *